United States Patent
Ogawa et al.

(10) Patent No.: US 6,909,501 B2
(45) Date of Patent: Jun. 21, 2005

(54) PATTERN INSPECTION APPARATUS AND PATTERN INSPECTION METHOD

(75) Inventors: Riki Ogawa, Yokohama (JP); Yasushi Sanada, Yokohama (JP); Mitsuo Tabata, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 673 days.

(21) Appl. No.: 09/956,010

(22) Filed: Sep. 20, 2001

(65) Prior Publication Data

US 2002/0037099 A1 Mar. 28, 2002

(30) Foreign Application Priority Data

Sep. 28, 2000 (JP) .......................................... 2000-297452

(51) Int. Cl.$^7$ ................................................ G01N 21/88
(52) U.S. Cl. ................................................... 356/237.5
(58) Field of Search ........................... 356/237.2–237.5

(56) References Cited

U.S. PATENT DOCUMENTS 5,173,719 A * 12/1992 Taniguchi et al. ....... 356/237.5
5,331,407 A * 7/1994 Doi et al. ................ 356/237.5
5,631,733 A * 5/1997 Henley .................... 356/237.2
5,892,579 A * 4/1999 Elyasaf et al. ........... 356/237.4

FOREIGN PATENT DOCUMENTS

JP          11-311608         11/1999

* cited by examiner

Primary Examiner—Richard A. Rosenberger
(74) Attorney, Agent, or Firm—Oblon, Spivak, McClelland, Maier & Neustadt, P.C.

(57) ABSTRACT

A pattern inspection apparatus includes a pulse laser light source sequentially generating pulse laser light, an illumination optics applying the pulse laser light onto a mask substrate, an imaging optics collecting light from the mask substrate to form an image thereof, an area sensor sensing the image of the mask substrate obtained by the optics in a rectangular area unit, a comparator comparing image data acquired by the area sensor with previously prepared reference data to detect a defect of a pattern, a stage driving apparatus two-dimensionally scanning a stage having the mask substrate placed thereon, and a stage position detector detecting a position of the stage. With the above configuration, it is possible to efficiently inspect the surface of the mask substrate by adequately setting the moving speed of the mask substrate and the sensing timing of the sensing apparatus.

10 Claims, 10 Drawing Sheets

PATTERN INSPECTION APPARATUS AND PATTERN INSPECTION METHOD

CROSS-REFERENCE TO RELATED APPLICATIONS

This application is based upon and claims the benefit of priority from the prior Japanese Patent Application No. 2000-297452, filed Sep. 28, 2000, the entire contents of which are incorporated herein by reference.

BACKGROUND OF THE INVENTION

1. Field of the Invention

This invention relates to a pattern inspection apparatus for inspecting a to-be-inspected object and more particularly to a pattern inspection apparatus which inspects an original such as a reticle or mask used for transferring a fine circuit pattern onto a photosensitive substrate such as a wafer or glass plate or inspects the pattern defect of a substrate itself such as a wafer or glass plate on which the pattern on the original such as a reticle or mask is transferred.

2. Description of the Related Art

In the conventional pattern defect inspection apparatus, a to-be-inspected object such as a reticle or mask is illuminated in a spot form or rectangular form by guiding continuous light generated from a light source such as a lamp or continuous wave (CW) laser to the to-be-inspected object via an illumination optics. Light from the illuminated area is collected by means of an imaging optics and an image of the illuminated area of the to-be-inspected object is formed on the light receiving surface of an opto-electronic detector such as a line sensor or an area sensor using a CCD (Charge Coupled Device). An opto-electronic detection signal (image information) from the opto-electronic detector is input to an image processing apparatus which in turn performs the image processing operation for detecting defects of the to-be-inspected object.

At this time, the image processing apparatus can acquire a two-dimensional image of the to-be-inspected object by two-dimensionally moving a moving stage having a to-be-inspected object placed thereon in synchronism with fetching of image information (fetching of an opto-electronic detection signal from the opto-electronic detector) to perform the image processing operation. In this case, reference data (data formed at the time of designing of the to-be-inspected object) used for determining whether the to-be-inspected object is good or not is stored in a memory section included with the image processing apparatus. Therefore, it becomes possible to detect errors such as damage, defects, dust and foreign matter on the to-be-inspected object by comparing image information from the opto-electronic detector with the reference data by use of a comparing/determining section included with the image processing apparatus.

Recently, circuit patterns of semiconductor manufacturing masks are made finer year by year and the resolution required for a defect inspection apparatus becomes severer. In order to enhance the resolution, methods for making the wavelength of light from a light source shorter and attaining high NA of an objective lens are provided, but the method for attaining high NA is not preferable since the depth of focus is made smaller. Further, the wavelength of a light source of a stepper for transferring a pattern onto a semiconductor substrate by use of a mask is made shorter year by year, and at this time, it is preferable that the wavelength of a light source of the inspection apparatus is made substantially equivalent to that of the stepper in order to inspect the phase shift mask well. For the reasons described above, it is indispensable to make shorter the wavelength of light from the light source used in the defect inspection apparatus.

As a light source used in the stepper, a KrF excimer laser with the wavelength 248 nm is already used and a light source using an ArF excimer laser with the wavelength 193 nm is in the development stage. Therefore, it is expected that a defect inspection apparatus using the light source with the wavelength of approximately 193 nm will be realized.

At present, as a light source having a sufficient intensity at the wavelength of approximately 193 nm, an excimer laser and excimer lamp are known, but it is difficult to practically use a lamp having large line width in a deep-UV region in which achromatization cannot be attained. Therefore, it becomes necessary to use an excimer laser, but it is difficult for the excimer laser to continuously emit light in principle and such an excimer laser is not realized at present. As a result, a pulse light source is used as the light source, and in this case, the repetition frequency of the pulse limits the sensing frequency.

For example, since the repetition frequency of the KrF excimer laser which has been already practically used is 1 to 2 kHz, the performance of a line sensor which can effect the sensing operation at 30 kHz cannot be fully exhibited even if it is used. Since the repetition frequency of the laser is limited, the number of pixels which can be fetched for each pulse must be increased in order to enhance the throughput.

Therefore, it is necessary to increase the number of pixels of the line sensor, but a limitation is put on increasing the number of pixels of one sensor, and therefore, it is considered to arrange a plurality of sensors. First, a method for arranging line sensors in parallel at preset intervals is considered, but since it is necessary to continuously move a sensing portion by a distance corresponding to the interval between the sensors, jump the sensing portion to a portion which is not yet scanned and repeatedly perform the above operations, the apparatus is made complicated and difficult to be realized.

Secondly, a method for arranging a plurality of line sensors in a line in the arrangement direction of the pixels is considered, but in this method, it becomes necessary to enlarge the visual field of the objective lens since the total length of the sensor is enlarged and it becomes difficult to eliminate the aberration of the lens. Thus, the line sensor cannot be suitably used for increasing the number of pixels.

On the other hand, it is considered to use an area sensor in the inspection apparatus using the pulse laser light source, but concrete methods are not studied so far and are not yet put into practice. Particularly, when the area sensor is used, it is considered that movement of the to-be-inspected object and sensing timing become important, but these points are not studied at all in the past.

Thus, there is a strong possibility that a pulse laser is used in the inspection apparatus in order to enhance the resolution. However, if the same sensing method as that used when the continuous light source is used as the light source is used as in the conventional case, the throughput is extremely lowered. Therefore, it is strongly required to realize a sensing method which is suitably designed for the pulse laser.

There is a need for solving the above problem and providing a pattern inspection apparatus and pattern inspection method capable of efficiently inspecting the entire surface of a to-be-inspected object by using a pulse laser and area sensor.

BRIEF SUMMARY OF THE INVENTION

A pattern inspection apparatus according to a first aspect of this invention comprises a pulse laser light source which generates pulse laser light; an illumination optics which illuminates a to-be-inspected object with the pulse laser light from the pulse laser light source; an imaging optics which collects light from the to-be-inspected object illuminated by the illumination optics to form an image of the to-be-inspected object; an image sensing apparatus which senses the image of the to-be-inspected object obtained by the imaging optics in a rectangular area unit, the image sensing apparatus including one area sensor and fetching the image once for each pulse in synchronism with the pulse laser light; a comparator which compares image data acquired by the image sensing apparatus with previously prepared reference data to detect a defect of a pattern; a stage driving apparatus which two-dimensionally scans a stage having the to-be-inspected object placed thereon; and a stage position detector which detects a position of the stage and outputs position data thereof.

A pattern inspection apparatus according to a second aspect of this invention comprises a pulse laser light source which sequentially generates pulse laser light; an illumination optics which illuminates a to-be-inspected object with the pulse laser light from the pulse laser light source; an imaging optics which collects light from the to-be-inspected object illuminated by the illumination optics to form an image of the to-be-inspected object; an image sensing apparatus which senses the image of the to-be-inspected object obtained by the imaging optics in a rectangular area unit, the image sensing means including a plurality of area sensors and the plurality of area sensors fetching the image once for each pulse in synchronism with the pulse laser light; a comparator which compares image data acquired by the image sensing means with previously prepared reference data to detect a defect of a pattern; a stage driving apparatus which two-dimensionally scans a stage having the to-be-inspected object placed thereon; and a stage position detector which detects a position of the stage and outputs position data thereof.

A pattern inspection apparatus according to a third aspect of this invention comprises a pulse laser light source which generates pulse laser light; an illumination optics which illuminates a to-be-inspected object with the pulse laser light emitted from the pulse laser light source; an imaging optics which collects light from the to-be-inspected object illuminated by the illumination optics to form an image of the to-be-inspected object; an image sensing apparatus which senses the image of the to-be-inspected object obtained by the imaging optics in a rectangular area unit, the image sensing apparatus including N (N is a positive integer) area sensors and each of the area sensors fetching the image at a frequency F/N when a frequency of the light pulse is F; a comparator which compares image data acquired by the image sensing apparatus with previously prepared reference data to detect a defect of a pattern; a stage driving apparatus which two-dimensionally scans a stage having the to-be-inspected object placed thereon; and a stage position detector which detects a position of the stage and outputs position data thereof.

A pattern inspection method according to a fourth aspect of this invention comprises sequentially illuminating a partial area on a to-be-inspected object with pulse laser light from a pulse laser light source at a frequency F; focusing light from the to-be-inspected object illuminated by the pulse laser light on at least one area sensor to sense image data of the partial area once for each pulse of the pulse laser light; continuously moving a stage having the to-be-inspected object placed thereon at a speed of LXF/n (n is a positive integer) in an X direction when the partial area on the to-be-inspected object fetched by one measurement by the area sensor is a rectangle of Lx (which is the length in the X direction)×Ly (which is the length in a Y direction); moving the stage by at least Ly in a stepwise fashion in the Y direction; repeatedly making the movements in the X and Y directions to two-dimensionally scan the to-be-inspected object; and comparing the image data obtained by the sensor with previously prepared reference data to detect defects of a pattern.

DETAILED DESCRIPTION OF THE INVENTION

Before explaining the embodiments, the feature of this invention is explained. According to the embodiments, the surface of a to-be-inspected object can be closely inspected while the to-be-inspected object is being continuously moved by using an area sensor in an image sensing apparatus, driving the to-be-inspected object in accordance with timing of pulse laser light and sensing the image of the to-be-inspected object in synchronism with the timing of the light pulse in the unit of a rectangular area.

At this time, since a short pulse width of 10 ns of the pulse light plays a role of high-speed shutter, it becomes unnecessary to provide a shutter on the sensor side and it becomes possible to slowly fetch data in a time period between pulses. Further, unlike the line sensor, since the number of pixels can be two-dimensionally increased, the visual field of the optics can be effectively used. That is, it becomes possible to efficiently inspect the surface of the to-be-inspected object by use of a pulse laser and area sensor.

Further, the area sensor can be more effectively utilized by using a plurality of area sensors and optimizing the timing of sensing and the moving speed of the to-be-inspected object. In addition, by setting the wavelength of the pulse laser light to 250 nm or less, the defect inspecting process can be effected by using the wavelength which is equivalent to or less than that of the KrF excimer laser used in the present stepper and defects of a mask or the like used in the stepper can be inspected with sufficiently high precision.

There will now be described embodiments of this invention with reference to the accompanying drawings.

(First Embodiment)

Figure 1:
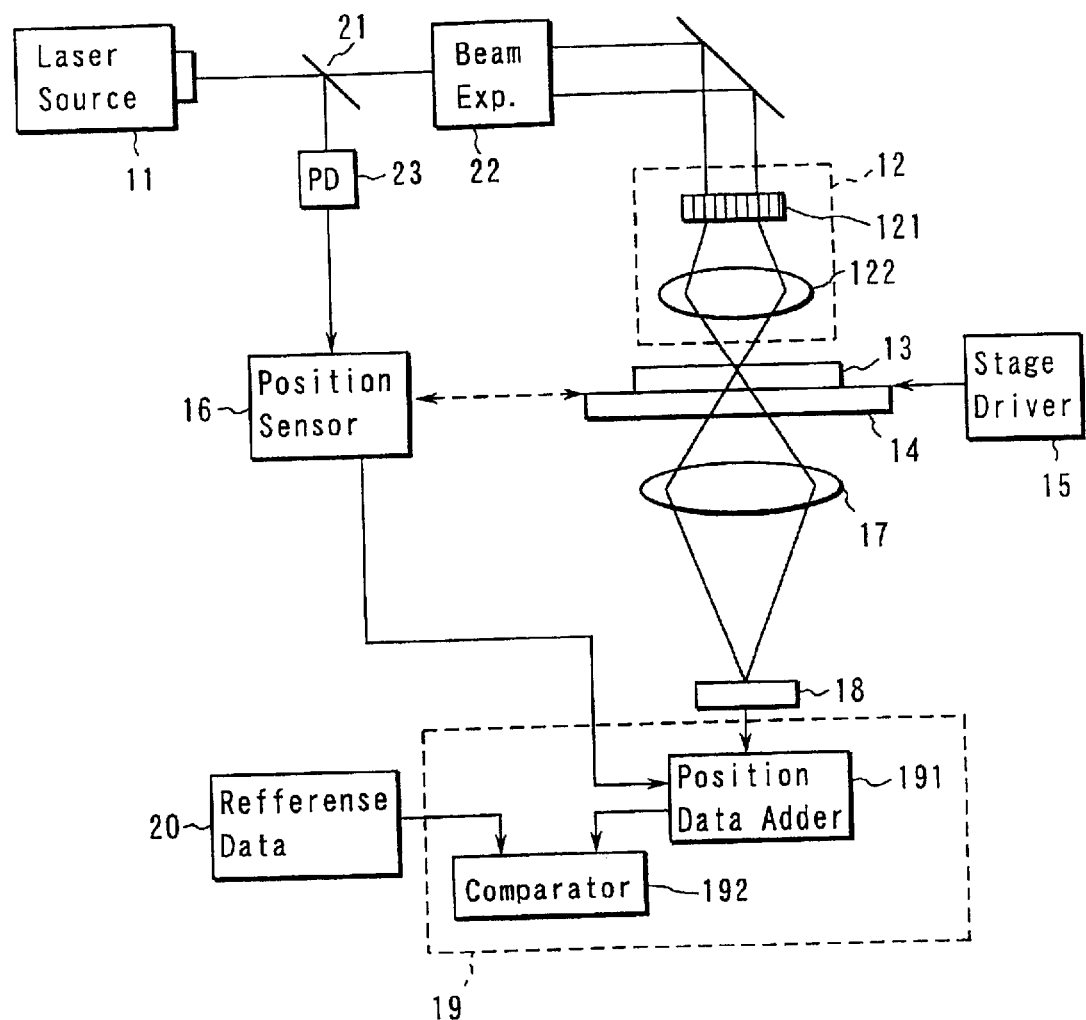
FIG. 1 is a schematic construction diagram of a pattern inspection apparatus according to a first embodiment.

FIG. 1 is a schematic construction diagram of a pattern inspection apparatus according to a first embodiment.

Pulse laser light emitted from a KrF excimer laser used as a pulse laser light source 11 is divided by a half mirror 21, one portion is guided to a photodiode 23 and the remaining portion is guided to a beam expander 22. The photodiode 23 supplies a voltage output which is proportional to the intensity of light incident on itself to a stage position sensing means 16.

Light incident on the beam expander 22 is enlarged to a desired diameter and emitted and uniformly illuminated on a mask 13 as a to-be-inspected object by an illumination optics 12. The illumination optics 12 is constructed by a Köheler's illumination system to uniformly illuminate the mask surface and includes an optical integrator 121 and condenser lens 122. In the Köheler's illumination system, speckle noise becomes a problem in some cases due to superposition of illumination light on the mask surface. In such a case, uniform illumination can be attained by placing a scanning mirror or the like in front of the optical integrator.

The mask 13 is placed on a stage 14 which is two-dimensionally driven in x-y directions by a stage driving apparatus 15. The movement position of the stage 14 is measured by a stage position detector 16. The stage position detector measures the coordinates of the position of the stage 14 by use of a laser measuring device or the like and supplies stage position data to a comparator 19 in synchronism with a voltage variation supplied from the photodiode 23.

Figure 2:
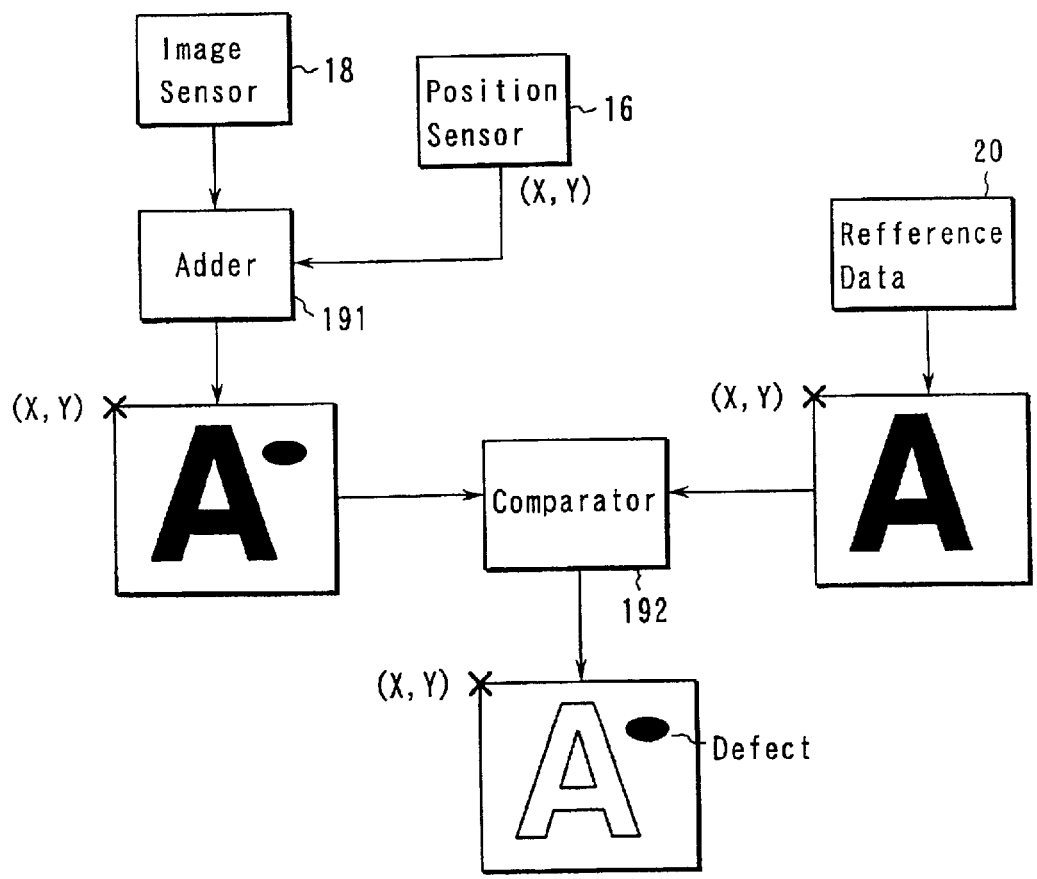
FIG. 2 is a block diagram for illustrating operation of a position data adder in FIG. 1.

Light which has passed through the mask 13 when the mask is illuminated by the illumination optics 12 is focused on the light receiving surface of an image sensing apparatus 18 by an imaging optics 17. Image data sensed by the image sensing apparatus 18 is supplied to the comparator 19 and compared with reference data 20. As shown in FIG. 2, the comparator 19 includes a position data adder 191 and comparator 192 and the position data adder adds position data supplied from the stage position detector 16 to the image data and supplies the result of addition to the comparator 192. The comparator 192 compares the supplied image data with the reference data 20 to determine the presence or absence of defects. Further, the comparison result by the comparator 19 is displayed on a display device (not shown) such as a CRT monitor.

In this embodiment, as the image sensing apparatus 18, one area sensor, for example, a CCD image sensor is used. The image fetching process by the area sensor is effected in synchronism with the timing of the light pulse and one image fetching process is effected for each pulse.

Figure 3:
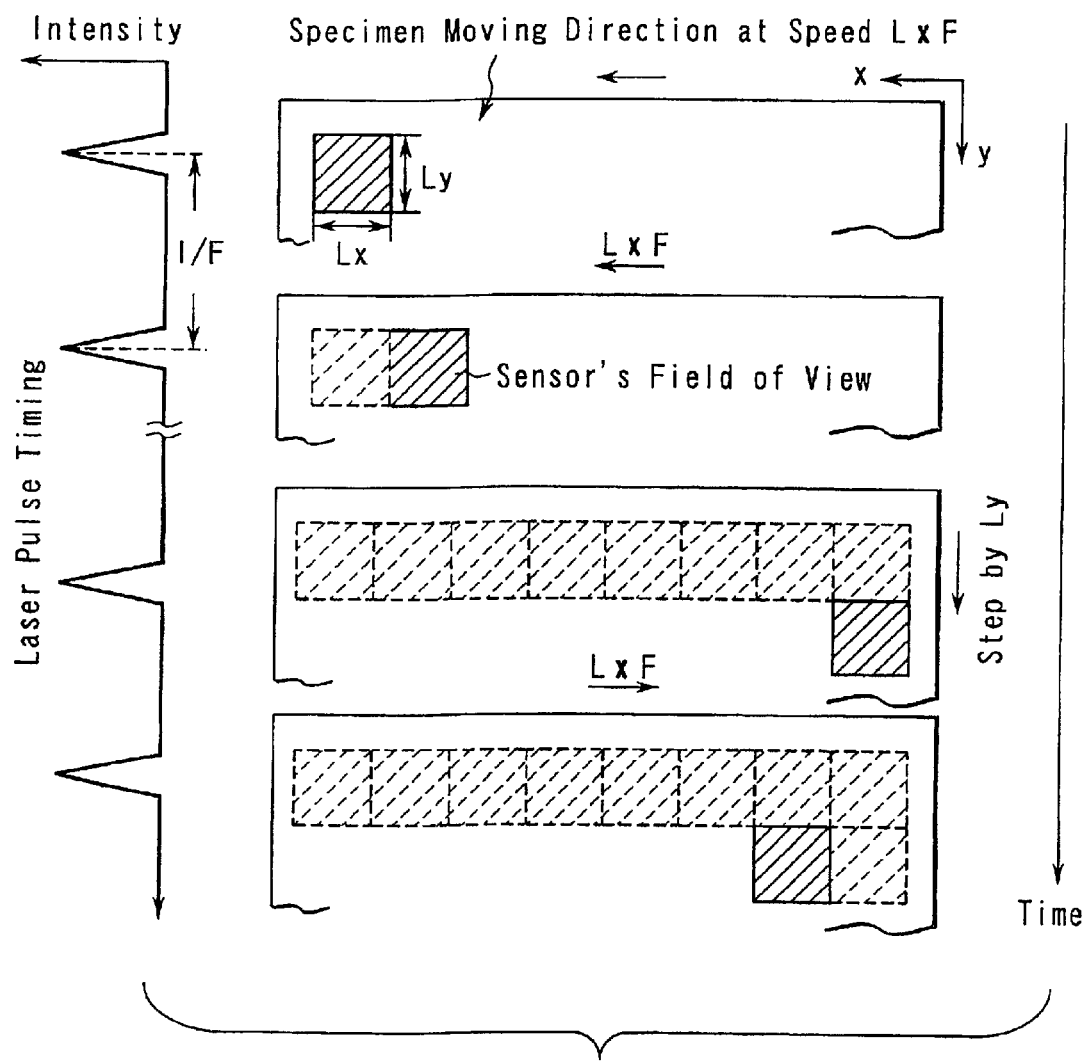
FIG. 3 is a diagram showing the relation among the visual field of an area sensor, stage movement and timing of a light pulse in the first embodiment.

For the moving speed of the to-be-inspected object (specimen) 13 by the stage driving apparatus 15, the stage 14 is moved at a speed of Lx×F [mm/s] in the x direction when an area on the surface of the to-be-inspected object which is conjugate with the area sensor is defined by Lx [mm]×Ly [mm] and the pulse repetition frequency is set at F [Hz] as shown in FIG. 3. Thus, the surface of the to-be-inspected object can be closely inspected in the x direction. If the end of the inspecting area in the x direction is reached, the stage is moved by Ly in a stepwise fashion in the y direction and then scanned in the −x direction this time. If the above operation is repeatedly effected until the end of the inspecting area in the y direction is reached, the surface of the to-be-inspected object can be closely inspected.

Further, the image fetching process by the area sensor is started immediately after emission of pulse light and is completed before emission of next pulse light. In this case, since the pulse width of a KrF excimer laser is approximately 10 ns and extremely short, it is not necessary to provide a shutter for the area sensor.

If external light is shielded, charges are not accumulated on the area sensor 18 between pulses, and therefore, a full-frame transfer type CCD can be used.

Since the position data, which is added to the image data fetched by the sensor 18, can be precisely measured by the stage position detector 16, the moving speed of the to-be-inspected object 13 may be made lower than Lx F. Since it is expected that the effect of preventing inadvertent omission of image fetching can be attained by superposing several images, it is not always necessary to enhance the precision of the movement of the stage 14 for moving the to-be-inspected object 13.

The above method is the simplest one, but the method becomes unsatisfactory in some cases. Since the sensing process by the area sensor 18 is effected once for each emission of one pulse, it is difficult to attain the effect of averaging and there is a possibility that speckle noise will remain. Therefore, it is necessary to average the results obtained by a plurality of pulses in some cases when highly coherent illumination light is used. It is easy to apply a plurality of pulses if the to-be-inspected object 13 is moved in a combination of a continuous fashion and a stepwise fashion, but it is difficult to attain the above operation while the throughput is kept high.

Figure 4:
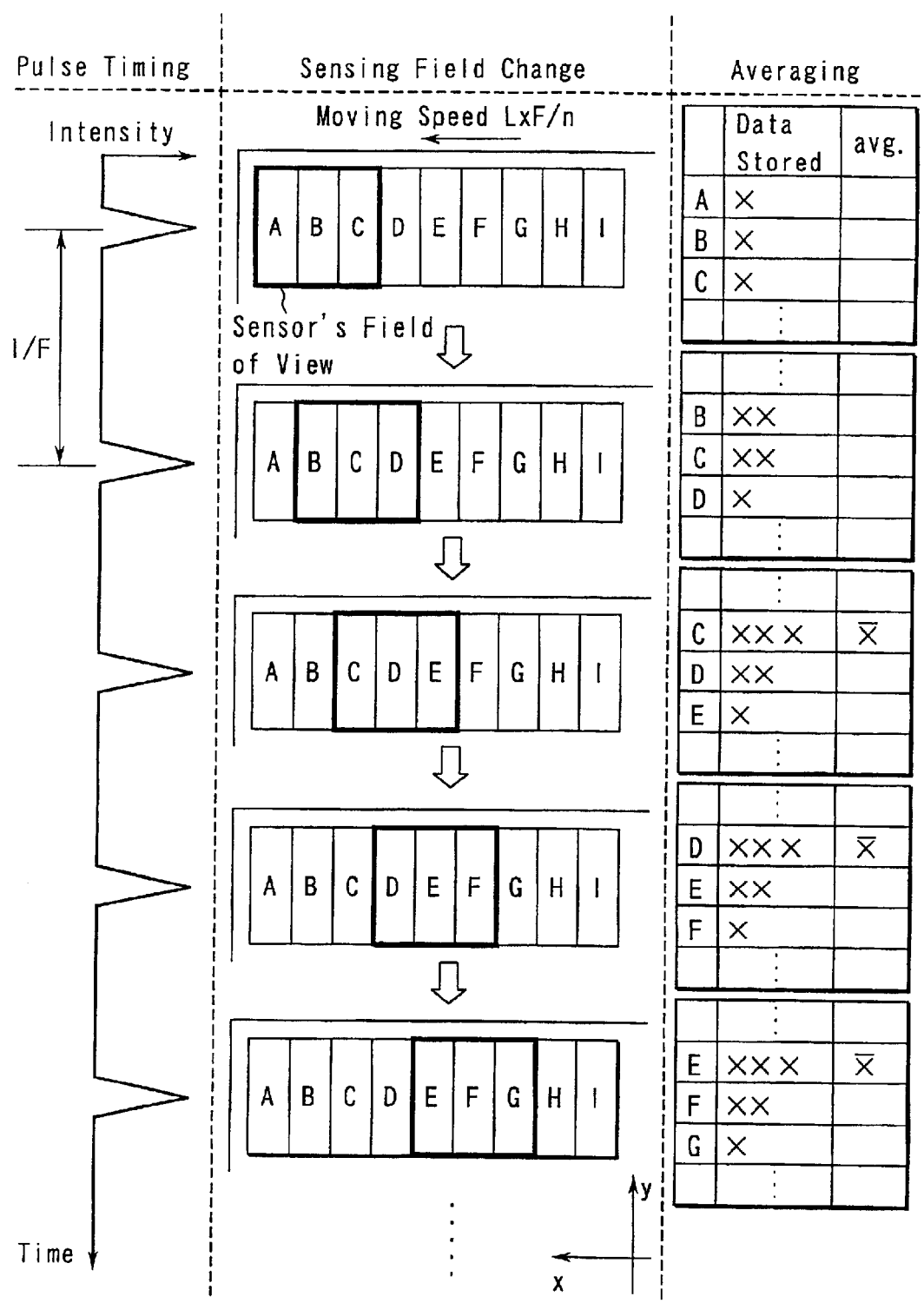
FIG. 4 is a schematic diagram for illustrating the concept of averaging of sensed image data items in the first embodiment and showing the presence (X) or not of image data stored in correspondence to areas A, B, C, . . . and timing at which the averaging process (/X) is effected in addition to the relation among the visual field of an area sensor, stage movement and timing of a light pulse.

Therefore, in this embodiment, a method in which the moving speed in the x direction is set at LxF/n is proposed. In this case, n indicates the number of pulses used for averaging. FIG. 4 is a conceptual diagram showing a case wherein n=3 and an image of one area can be fetched three times by use of one area sensor by moving the to-be-inspected object at a speed of Lx/3. However, since the image on the area sensor is moved for each pulse, the images cannot be superposed on the sensor. Therefore, it is necessary to average acquired image information items converted into a digital form on a circuit. As shown in FIG. 4, acquired image information items are stored into memory areas assigned for the respective areas on the to-be-inspected object. The contents of the memory area having stored image information three times are subjected to the averaging process and then compared with reference data. The averaging process is effected in the position data adder 191 in FIG. 1.

Thus, in this embodiment, the surface of the to-be-inspected object can be closely scanned and the surface of the to-be-inspected object 13 can be efficiently inspected by using the pulse laser light source 11 and one area sensor 18, fetching an image once for each pulse in synchronism with the light pulse output from the laser light source 11 and, at the same time, repeatedly making the continuous movement at the speed of LxF in the x direction and the stepwise movement of Ly in the y direction by use of the stage driving apparatus 15.

Further, the surface of the to-be-inspected object can be closely inspected and the surface of the to-be-inspected object 13 can be scanned n times by use of one sensor 18 by repeatedly making the continuous movement at the speed of LxF/n in the x direction and the stepwise movement of Ly in the y direction by use of the stage driving apparatus 15. Therefore, a more precise image sensing process can be attained by averaging n image information items.

(Second Embodiment)

In the second embodiment, a method for compensating for an insufficient number of pixels when the number of pixels of an area sensor is insufficient is explained. As the area sensor, a CCD, CMOS or the like is provided and the number of pixels measured in one cycle and the frequency for measurement have limitations. Generally, the number of pixels and the frequency are set in a trade-off relation and it is difficult to simultaneously attain both of the desired number of pixels and the desired frequency by use of a single sensor.

Figure 5A:
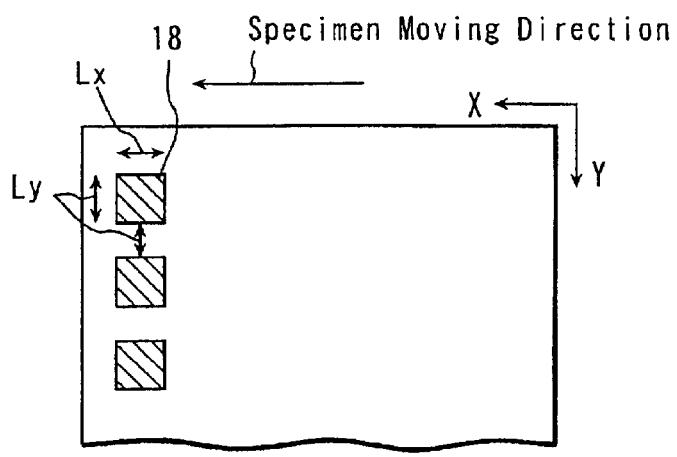
FIGS. 5A to 5C are diagrams showing a pattern inspection method according to a second embodiment in a stepwise fashion and showing the layout of three sensors arranged in the y direction (FIG. 5A) and the image fetching procedure (FIGS. 5B, 5C)

Therefore, a method using a plurality of area sensors is adopted in order to enhance the throughput. It is assumed that the basic construction of a pattern inspection apparatus is the same as that shown in FIG. 1. First, a plurality of area sensors 18 are arranged in the y direction as shown in FIG. 5A (three area sensors in this embodiment). At this time, the interval between conjugate regions of the respective sensors is set at Ly on the surface of a to-be-inspected object (specimen).

Figure 5B:
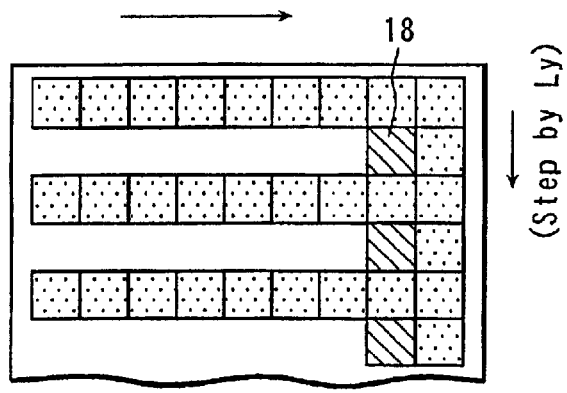
Figure 5C:
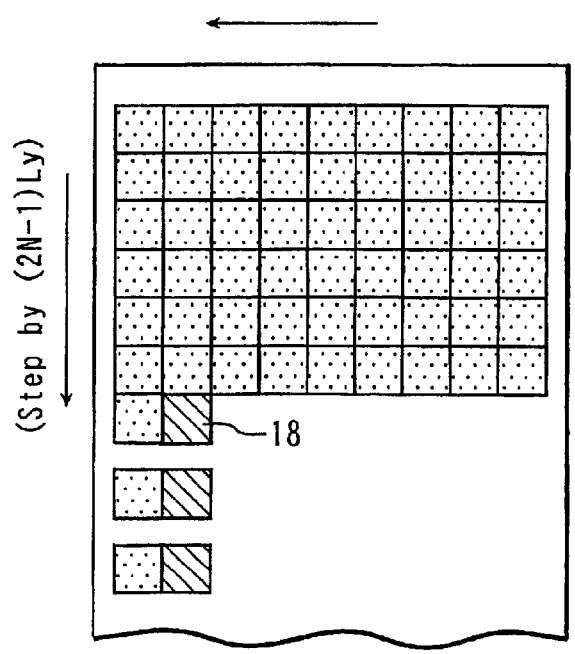

Like the first embodiment (FIG. 3), a stage 14 is moved at a speed of Lx×F [mm/s] in the x direction, moved by Ly in a stepwise fashion in the y direction after scanning of the inspecting area in the x direction is terminated, and then moved in the −x direction (FIG. 5B).

If scanning in the −x direction is terminated, the stage is moved by Ly (2×(the number of sensors−1), five in this embodiment) in the stepwise fashion and scanned in the x direction again. The above operation is repeatedly effected to closely scan the inspecting area.

Thus, the number of scanning operations in the x direction can be reduced to 1/N by using N area sensors 16 and time required for inspection can be shortened.

The method can be compatible with the method for averaging n image information items. That is, in addition to the above method, an image of one area can be fetched by n times by moving the stage 14 at a speed of LXF/n in the x direction. As a result, the inspection speed will be lowered to 1/n of that in the case of the above method, but image information items for n pulses can be averaged and a more precise sensing operation can be attained.

(Third Embodiment)

In the third embodiment, a method for compensating for an insufficient image fetching frequency of an area sensor when the image fetching frequency of the area sensor is insufficient is explained. The problem can also be solved by using a plurality of area sensors. It is assumed that the basic construction of a pattern inspection apparatus used in this embodiment is the same as that shown in FIG. 1.

Figure 6:
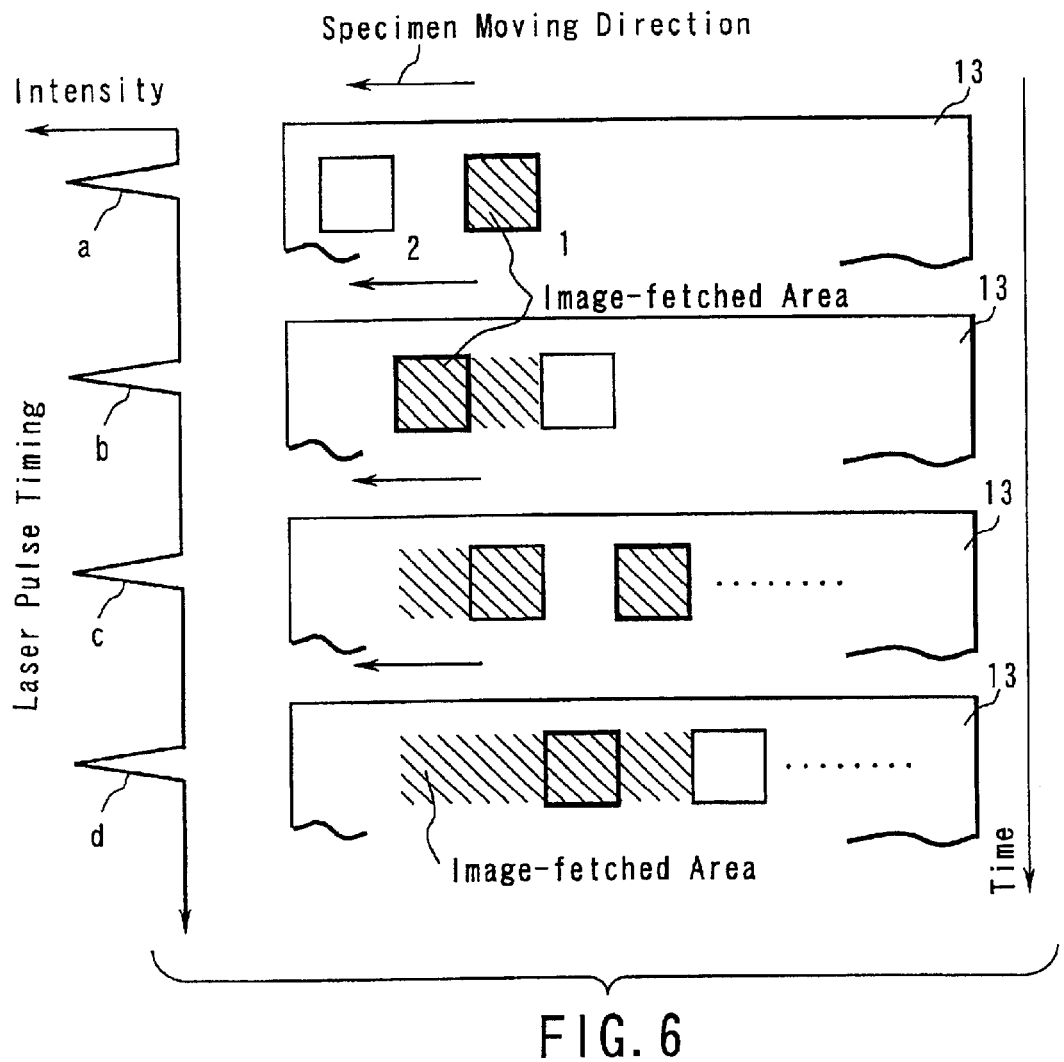
FIG. 6 is a diagram showing a pattern inspection method according to a third embodiment and showing the layout of two sensors arranged in the x direction and the image fetching procedure.

FIG. 6 shows the procedure. The procedure is a procedure when the averaging process is not effected and is realized by arranging two area sensors in the x direction. The interval between the two area sensors corresponds to one sensor size. In this case, the pulse repetition frequency is set at F and the image fetching frequency of the sensor is set at F/2. An image corresponding to an area illuminated by a pulse a is fetched by a sensor 1 and an image corresponding to an area illuminated by a pulse b is fetched by a sensor 2. Then, an image corresponding to an area illuminated by a pulse c is fetched by the sensor 1 and thus the same process is repeatedly effected to closely scan the inspecting area. At this time, the continuous moving speed of the to-be-inspected object (specimen) in the x direction is LxF. Further, it is necessary to shield the sensor 1 at the time of illumination by the pulse b and shield the sensor 2 at the time of illumination by the pulses a and c.

Figure 7:
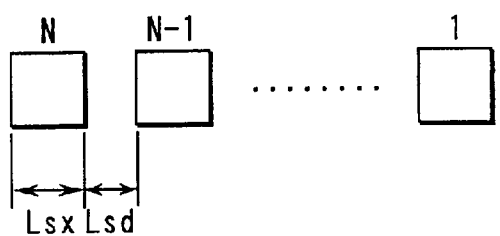
FIG. 7 is a diagram showing the relation between the layout of N sensors arranged in the x direction and the sensor interval in the third embodiment.

A sensing method for averaging n image information items by use of area sensors of N which is arbitrarily set can be used. It is assumed that N area sensors are arranged in the x direction as shown in FIG. 7. In this case, the length of the sensor in the x direction is Lsx and the interval between the sensors is Lsd. It is assumed that an image is sequentially fetched by a corresponding one of the sensors starting from the first sensor for each pulse and an image is fetched by the first sensor again after an image is fetched by the Nth sensor. At this time, pulses other than the pulse used for fetching are shielded.

In this case, the continuous moving speed of the to-be-inspected object and the condition of Lsd required for closely inspecting the to-be-inspected object after averaging n image information items are explained. If the length in the x direction of an area on the to-be-inspected object which is conjugate with the sensor surface is set at Lx and the length of a portion on the to-be-inspected object which is conjugate with a distance between the sensors is set at Ld, then it is clearly understood that the moving speed required for attaining a process for averaging n image information items is LxF/n.

Next, it is necessary to carefully set the interval between the sensors because the number of averaging processes cannot be uniformed on a whole specimen surface if the interval between the sensors is not adequately set. First, if the distance which the to-be-inspected object travels until images are sequentially fetched by the respective sensors starting from the first sensor and an image is fetched by the first sensor again after an image is fetched by the Nth sensor is calculated, the result becomes Lx/n×N.

Figure 8:
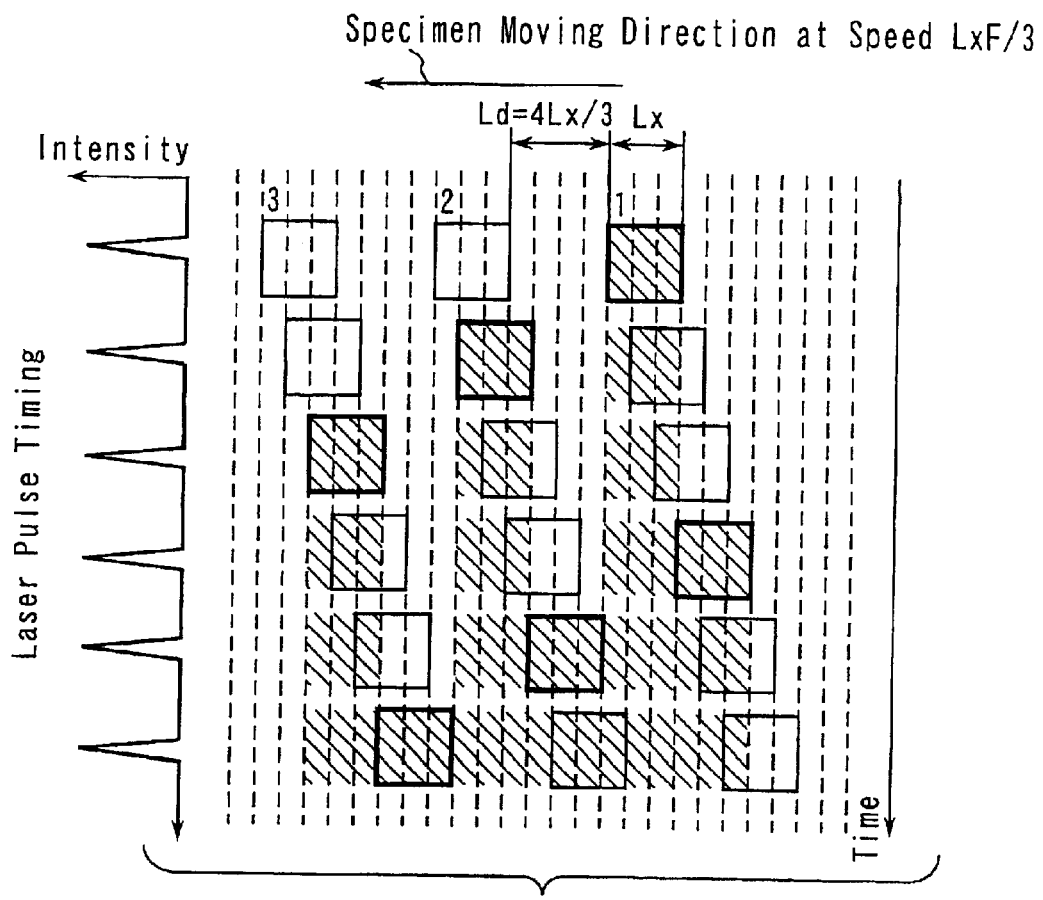
FIG. 8 is a diagram showing the image data fetching procedure in a case where N=3, n=3, Ld=4Lx/3 in the third embodiment.
Figure 9:
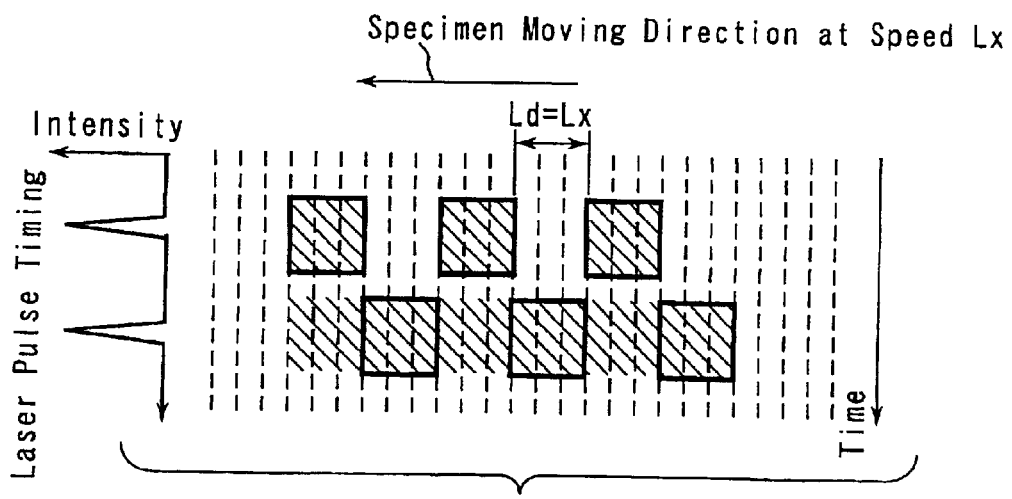
FIG. 9 is a diagram showing the image data fetching procedure capable of attaining the result equivalent to that of FIG. 8.

FIG. 8 shows a case wherein N=3, n=3, and Ld=4Lx/3, and in this case, the process for continuously moving the stage (to-be-inspected object or specimen) and sequentially fetching images by use of the sensor 1 to the sensor N in this order is equivalent to the process for simultaneously fetching images by use of the sensor layout in which the sensor interval on the to-be-inspected object (specimen) is set to Ld−Lx/n (=Lx) as shown in FIG. 9. Further, in a case where the sensor interval is Lx/n, the process becomes equivalent to the process for simultaneously fetching images by use of the sensor layout in which the sensor interval is "0", that is, the N sensors are continuously arranged without any gap provided therebetween. By taking the above condition into consideration, the following three conditions are set.

(In the case of $Ld-Lx/n=0$)

Figure 10:
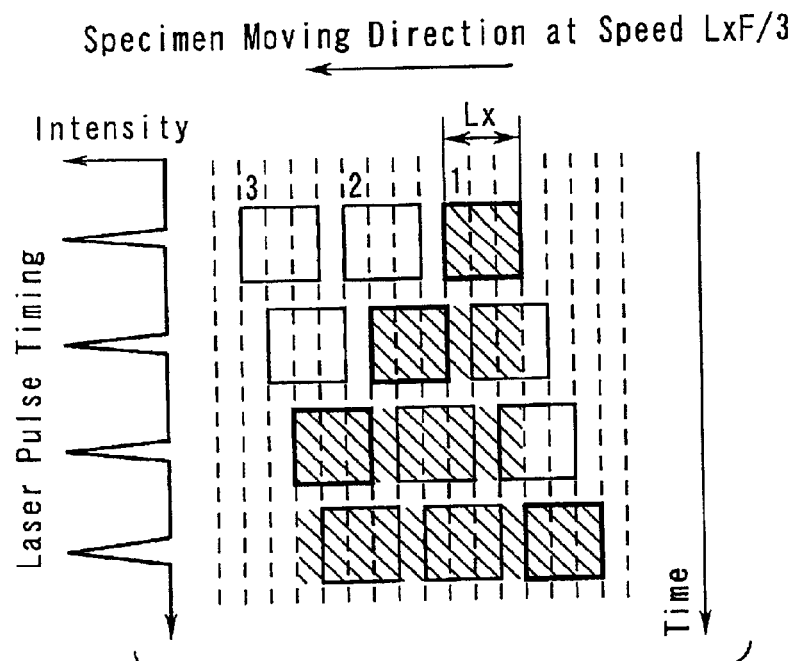
FIG. 10 is a diagram showing the image data fetching procedure in a case where N=3, n=3, Ld=Lx/3 in the third embodiment.

Since it becomes equivalent to a case wherein sensors are arranged without any gap provided therebetween and images are simultaneously fetched, images of the to-be-inspected object (specimen) can be fetched without leaving any space. A case wherein N=3, n=3, Ld=Lx/3 is shown in FIG. 10.

(In the case of $0<Ld-Lx/n$)

Since the imaging area of the sensor 2 is not superposed on the imaging area already taken by sensor 1 at the last pulse, it is sufficient if the surface of the to-be-inspected object is uniformly imaged by use of the imaging areas of the respective sensors. Therefore, in the simplest case, it is considered that it travels only by a fraction of an integral number of the sensor area during the process from fetching an image by sensor 1 to fetching an image by sensor n. That is, it is satisfactory if the following condition is satisfied.

$LxN/n=Lx/k$ ($k$ is a positive integer)

Figure 11:
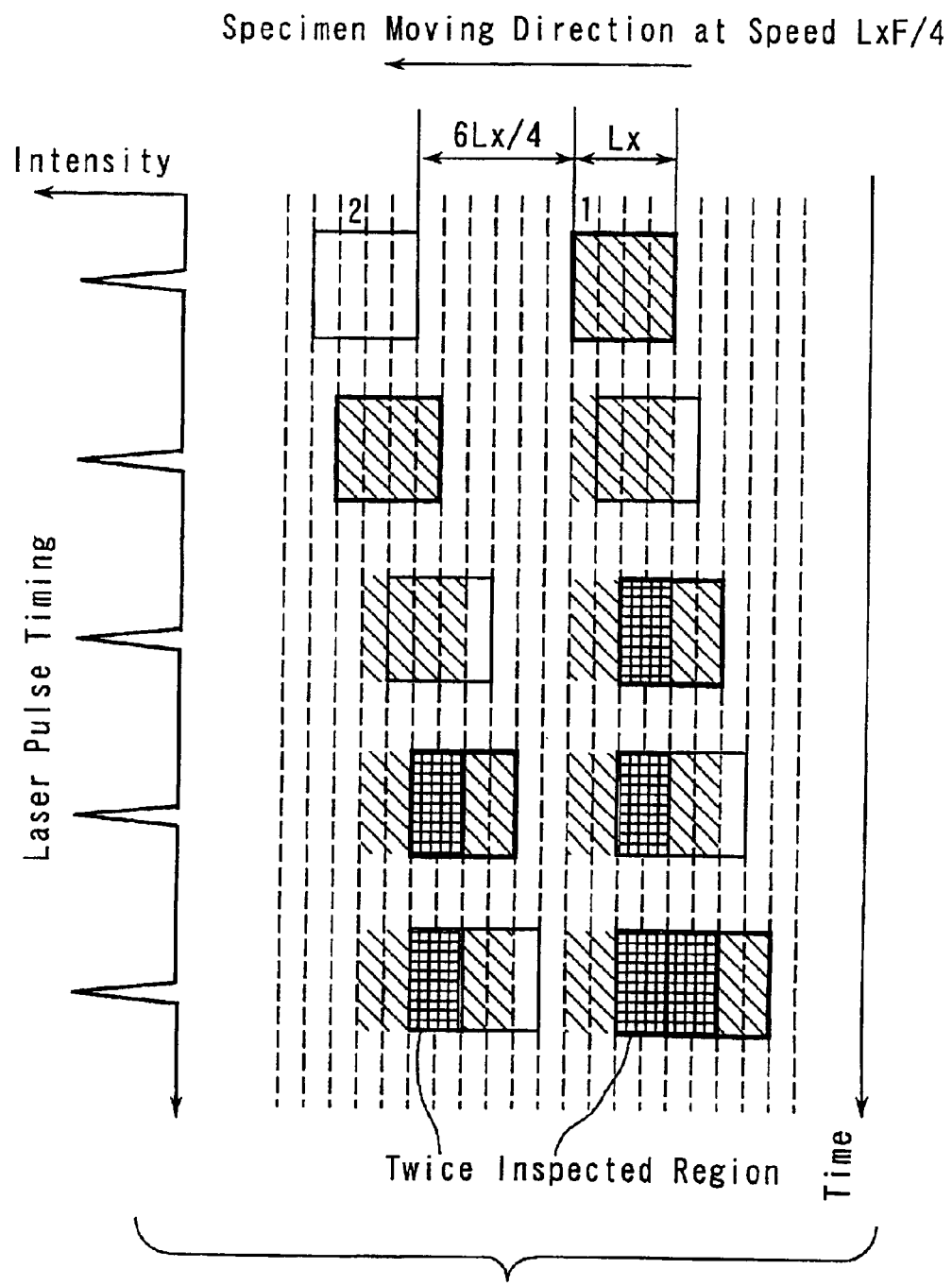
FIG. 11 is a diagram showing the image data fetching procedure in a case where N=2, n=4, Ld=6Lx/4 in the third embodiment.

As a result, the condition that n/N=k, that is, n is a multiple of N is set. A case wherein N=2, n=4, Ld=6Lx/4 is shown in FIG. 11, and in this case, since n/N is not an integral number, an area (overlapped portion) which is inspected twice exists.

(In the case of $Ld-Lx/n<0$)

Since the imaging area of the sensor 2 is superposed on the imaging area already taken by sensor 1 at the last pulse, it is necessary to scatter uniformly the superposed portion on the to-be-inspected object. For this purpose, it is necessary to satisfy the following condition.

$Lx/n \times N=Lx/n-Ld$

Figure 12:
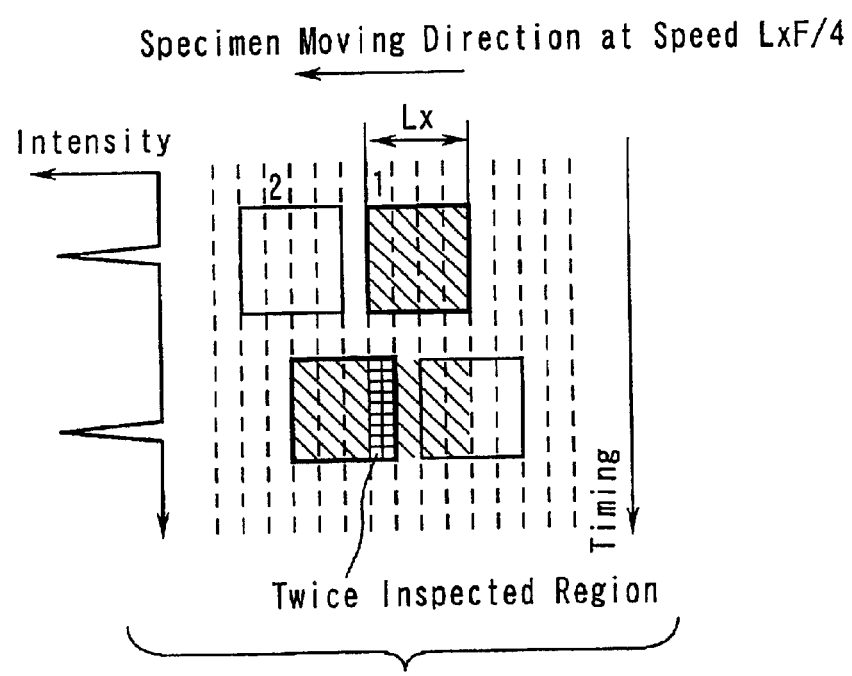
FIG. 12 is a diagram showing the image data fetching procedure in a case where N=2, n=2, Ld=Lx/4 in the third embodiment.

However, Ld derived from the above equation is Ld=Lx (1−N) and if a plurality of sensors with N>1 are used, Ld<0 and this cannot be realized. A case wherein N=2, n=2, Ld=¼×Lx is shown in FIG. 12, but in this case, an area (overlapped portion) which is inspected twice exists.

The above results are summarized. The number N of sensors is determined by the sensor frequency Fs and pulse frequency Fp. That is, N=Fp/Fs and the number n of averaging processes depends on the degree of noise, and Lx is determined by the number of pixels of the sensor. They are treated as constants, and if Ld is estimated to determine the layout, the following results can be obtained.

(1) In a case where n is not a multiple of N, Ld=Lx/n.
(2) In a case where n is a multiple of N, Ld≧Lx/n.

By using the above results, it is possible to propose a sensor layout under the general condition. For example, if the pulse frequency Fp of the excimer laser is 1000 Hz, the length of a sensor area in the x direction is 10 mm, the length Lx in the x direction of an area on the to-be-inspected object which is conjugate with the sensor area is 150 µm, the image fetching frequency Fs of the sensor is 500 Hz, the number of sensor pixels is 500×500 pixels, and the number n of averaging processes is 10, the number N of sensors is Fp/Fs=2 and since the N is a multiple of n, the interval Ld between conjugate regions of the sensors on the to-be-inspected object should be set as follows.

$Ld \geq Lx/n=150/10=15$ µm

In this case, the throughput becomes equal to the number of pixels/n×Fp=500×500/10×1000=2.5×10$^7$ pix/s, but if this is insufficient, sensors may be added in the y direction.

(Fourth Embodiment)

A more concrete example of the third embodiment is explained as a fourth embodiment of this invention. The schematic construction of an inspection apparatus is the same as that shown in FIG. 1. An ArF excimer laser which emits pulse light having a wavelength of 193 nm, pulse width 10 ns, pulse repetition frequency 2 kHz is used as a light source 11. Light emitted from the light source 11 uniformly illuminates a to-be-observed substrate (reticle, mask or the like) 13 used as a to-be-inspected object via an illumination optics 12. The to-be-observed substrate 13 is placed on a stage 14 and two-dimensionally scanned by a stage driving means 15.

Light which is applied by the illumination optics 12 and has passed through the to-be-observed substrate 13 is collected by an imaging optics 17 and an image of the to-be-observed substrate 13 is formed on the light receiving surface of an image sensing apparatus 18. Image data fetched by the image sensing apparatus 18 is supplied to a comparator 19 together with measurement data of a stage position detector 16 which measures the movement position of the stage 14. Then, the image data is compared with previously prepared reference data 20 by the comparator 19 to determine the presence or absence of defects.

The image sensing apparatus 18 includes a plurality of area sensors. Each of the area sensors is a CCD image sensor in which the number of pixels is 500×250, the light receiving area Lsx×Lxy=5 mm×2.5 mm and the image fetching frequency Fs is 500 Hz. In order to attain the number n of image averaging processes=10 and the throughput of 7.0× 10$^7$ pix/sec or more, the image sensing apparatus 18 is constructed as follows.

First, since the pulse frequency Fp is 2000 Hz and the image fetching frequency Fs of the sensor is 500 Hz, it is necessary to arrange sensors of Fp/Fs=2000/500=4 in the x direction. Further, since the image averaging process is effected 10 times, only ⅒ of the number of pixels 500×250 of the area sensor can be fetched for each pulse. Therefore, in order to satisfy the throughput, it is necessary to arrange sensors of (7.0×10$^7$)/(500×250/10×2000)=2.8 or more in the y direction.

Figure 13:
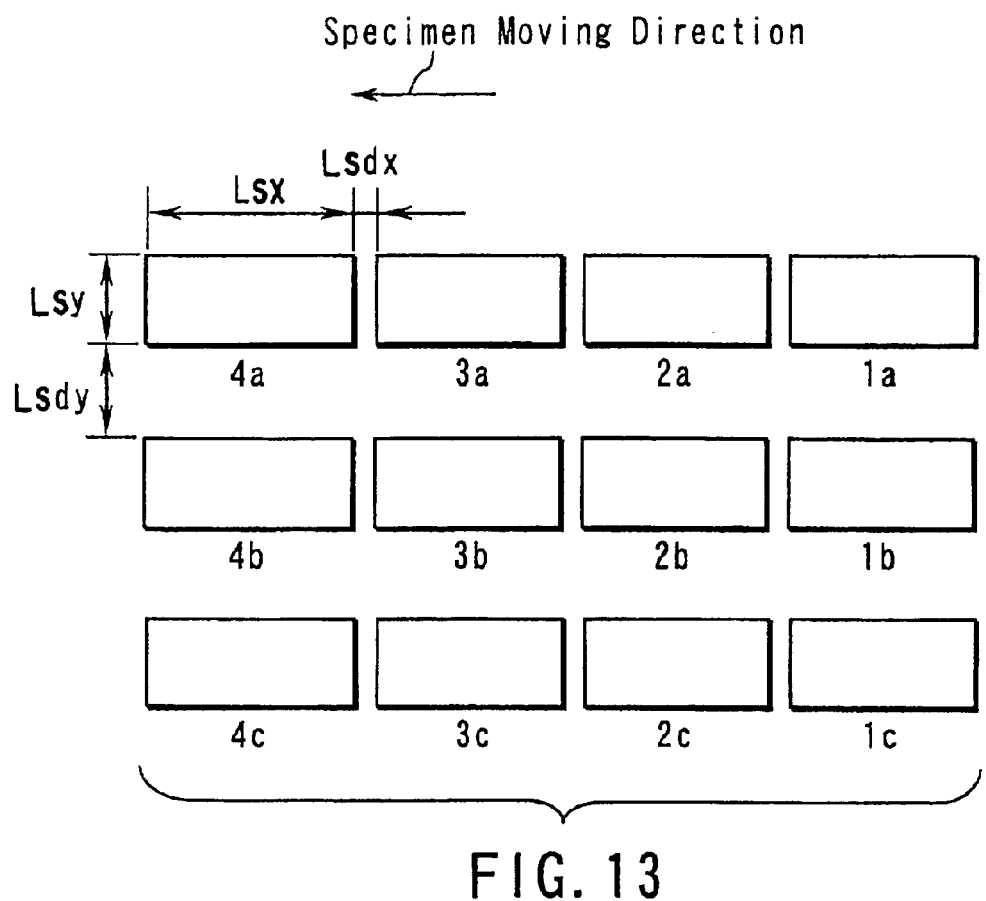
FIG. 13 is a diagram showing the layout of sensors in a fourth embodiment.

Accordingly, twelve sensors (1a to 4a, 1b to 4b, 1c to 4c) arranged by 4 columns in the x direction and 3 rows in the y direction as shown in FIG. 13 are prepared. The interval between the sensors is set to correspond to Lsdy=Lsy=2.5 mm in the y direction and it is set to correspond to Lsdx= Lsx/n=50/10=5 mm in the x direction since the number n=10 of the averaging processes is not a multiple of the number N=4 of sensors in the x direction.

Next, a process for closely inspecting the to-be-observed substrate 13 is explained. Areas on the to-be-observed substrate 13 which are conjugate with the sensors are rectangles which are configured by four column in the x direction and three rows in the y direction and arranged at desired intervals. The length of the rectangle in the x direction is determined by the optical magnification and Lx=150 µm in this embodiment. Therefore, the substrate 13 is continuously moved at a speed of LxF/n=150×2000/10= 30 mm/sec in the x direction. The sensing process is itemized below.

(1) The stage 14 is continuously moved at a speed of 30 mm/s in the x direction.

The image sensing system simultaneously fetches first pulse illumination by use of the sensors 1a, 1b, 1c;
second pulse illumination by use of the sensors 2a, 2b, 2c;
third pulse illumination by use of the sensors 3a, 3b, 3c;
fourth pulse illumination by use of the sensors 4a, 4b, 4c;
fifth pulse illumination by use of the sensors 1a, 1b, 1c;
and repeatedly effects the above operations.

At this time, pulses other than the pulse to be fetched are shielded by shutters attached to the respective sensors.

(2) The stage is moved by Ly=75 μm in a stepwise fashion in the y direction when it has reached the end of the sensing area in the x direction.

(3) The stage 14 is continuously moved at a speed of 30 mm/s in the −x direction.

The image sensing system simultaneously fetches first pulse illumination by use of the sensors 4a, 4b, 4c;
second pulse illumination by use of the sensors 3a, 3b, 3c;
third pulse illumination by use of the sensors 2a, 32, 2c;
fourth pulse illumination by use of the sensors 1a, 1b, 1c;
fifth pulse illumination by use of the sensors 4a, 4b, 4c;
and repeatedly effects the above operations.

At this time, pulses other than the pulse to be fetched are shielded by shutters attached to the respective sensors.

(4) The stage is moved by 75×(2×3−1)=375 μm in a stepwise fashion in the y direction when it has reached the end of the sensing area in the −x direction.

(5) The operations (1) to (4) are repeatedly effected.

(6) The process is terminated when the stage comes to the end of the sensing area in the x and y directions.

The stage position detector 16 receives a signal from the photodiode 23 in synchronism with a laser pulse and transmits thus read stage position data to the comparator 19 in synchronism with the timing. An image of the to-be-observed substrate 13 formed by the imaging optics 17 is converted into image signals by the 16 area sensors included in the image sensing apparatus 18.

The comparator 19 adds position data from the stage position detector 16 to the image signal fetched by the image sensing apparatus 18. Image data items having position data added thereto are sequentially stored in the memory for averaging. The averaging process is started after ten data items are stored and averaged data is compared with designed data 20 to determine the presence or absence of defects.

Thus, in this embodiment, the surface of the to-be-inspected object can be effectively scanned by use of the sensors 18 arranged in the x direction by adequately setting the number N of sensors 18, sensor interval and stage speed according to the condition described in the third embodiment based on the frequency Fp of the pulse laser light source 11 used for inspecting defects of the to-be-inspected object 13 such as a mask, the fetching frequency Fs of the area sensors 18 and the number n of averaging processes. Further, the sufficiently high throughput can be attained by setting the number of sensors 18 arranged in the y direction according to the required throughput.

This invention is not limited to the above embodiments. For example, the area sensor included in the sensing apparatus is not limited to the CCD image sensor, it is possible to use any type of sensor which can two-dimensionally sense an image and a CMOS image sensor may be used. Further, the pulse laser light source is not limited to the KrF excimer laser or ArF excimer laser and any type of laser which can emit light with sufficiently short wavelength (250 nm or less) in a pulse form may be used.

As described above, according to this invention, in the pattern inspection process using a pulse laser as a light source, the surface of a to-be-inspected object can be efficiently inspected by using an area sensor as an image sensing apparatus and adequately setting the sensing timing of the sensing apparatus and the moving speed of the to-be-inspected object.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection apparatus, comprising:
a pulse laser light source which generates pulse laser light;
an illumination optics which illuminates a to-be-inspected object with the pulse laser light from the pulse laser light source;
an imaging optics which collects light from the to-be-inspected object illuminated by the illumination optics to form an image of the to-be-inspected object;
an image sensing apparatus which senses the image of the to-be-inspected object obtained by the imaging optics in a rectangular area unit, the image sensing apparatus including one area sensor and fetching the image once for each pulse in synchronism with the pulse laser light;
a comparator which compares image data acquired by the image sensing apparatus with previously prepared reference data to detect a defect of a pattern;
a stage driving apparatus which two-dimensionally scans a stage having the to-be-inspected object placed thereon; and
a stage position detector which detects a position of the stage and outputs position data thereof,
wherein the stage driving apparatus closely scans a surface of the to-be-inspected object by repeatedly making continuous movement at a speed of LxF/n in an x direction and stepwise movement of Ly in a y direction when an area on the to-be-inspected object which is fetched by one measurement by the area sensor is a rectangle of Lx (length)×Ly (length), a frequency of the pulse laser light is F, and n is a positive integer; and
the comparator calculates average data by averaging n image information items obtained for respective coordinates on the to-be-inspected object corresponding to one pixel on the area sensor based on position data of the stage and image data obtained from the image sensing apparatus and compares the average data with the previously prepared reference data.

2. The pattern inspection apparatus according to claim 1, wherein the comparator adds a position coordinate to the image data based on position data from the stage position detector and compares the image data having the position coordinate added thereto with the reference data.

3. A pattern inspection apparatus, comprising:
a pulse laser light source which sequentially generates pulse laser light;
an illumination optics which illuminates a to-be-inspected object with the pulse laser light from the pulse laser light source;
an imaging optics which collects light from the to-be-inspected object illuminated by the illumination optics to form an image of the to-be-inspected object;
an image sensing means which senses the image of the to-be-inspected object obtained by the imaging optics in a rectangular area unit, the image sensing apparatus including a plurality of area sensors, the plurality of area sensors fetching the image once for each pulse in synchronism with the pulse laser light;

a comparator which compares image data acquired by the image sensing apparatus with previously prepared reference data to detect a defect of a pattern;

a stage driving apparatus which two-dimensionally scans a stage having the to-be-inspected object placed thereon; and a stage position detector which detects a position of the stage and outputs position data thereof, wherein, when each of the inspecting surfaces of the plurality of area sensors is a rectangle of Lsx (length)× Lsy (length), the plurality of area sensors are arranged by N (N is a positive integer) at an interval of Lsy in a y direction; and when an area on the to-be-inspected object which is conjugate with each of the inspecting surfaces of the plurality of area sensors is a rectangle of Lx (length)× Ly (length), a frequency of the pulse laser light output from the pulse laser light source is F and n is a positive integer, the stage driving apparatus closely scans the to-be-inspected object by repeatedly performing operations for continuously moving the to-be-inspected object at a speed of LxF/n in an x direction, making stepwise movement of Ly in the y direction, then continuously moving the to-be-inspected object at the speed of LxF/n in a −x direction and making stepwise movement of Ly (2N−1) in the y direction; and the comparator calculates average data by averaging n image information items obtained for respective coordinates on the to-be-inspected object corresponding to one pixel on the area sensor based on position data of the stage and image data obtained from the image sensing means and compares the average data with the previously prepared reference data.

4. The pattern inspection apparatus according to claim 3, wherein, when each of the inspecting surfaces of the plurality of area sensors is the rectangle of Lsx (length)×Lsy (length), the plurality of area sensors are arranged by N at an interval of Lsy in the y direction; and when the area on the to-be-inspected object which is conjugate with each of the inspecting surfaces of the plurality of area sensors is the rectangle of Lx (length)× Ly (length) and the frequency of the pulse laser light output from the pulse laser light source is F, the stage driving apparatus closely scans the to-be-inspected object by repeatedly performing operations for continuously moving the to-be-inspected object at a speed of LxF in the x direction, making stepwise movement of Ly in the y direction, then continuously moving the to-be-inspected object at the speed of LxF in the −x direction and making stepwise movement of Ly(2N−1) in the y direction.

5. A pattern inspection apparatus comprising:

a pulse laser light source which generates pulse laser light;

an illumination optics which illuminates a to-be-inspected object with the pulse laser light emitted from the pulse laser light source;

an imaging optics which collects light from the to-be-inspected object illuminated by the illumination optics to form an image of the to-be-inspected object;

an image sensing apparatus which senses the image of the to-be-inspected object obtained by the imaging optics in a rectangular area unit, the image sensing apparatus including N (N is a positive integer) area sensors and each of the area sensors fetching the image at a frequency F/N when a frequency of the pulse laser light is F;

a comparator which compares image data acquired by the image sensing apparatus with previously prepared reference data to detect a defect of a pattern;

a stage driving apparatus which two-dimensionally scans a stage having the to-be-inspected object placed thereon; and a stage position detector which detects a position of the stage and outputs position data thereof.

6. The pattern inspection apparatus according to claim 5, wherein, when an area on the to-be-inspected object which is conjugate with each of inspecting surfaces of the N area sensors is a rectangle of Lx (length)×Ly (length), the stage driving apparatus closely scans the to-be-inspected object by repeatedly performing operations for continuously moving the to-be-inspected object at a speed of LxF in an x direction and then making stepwise movement of Ly in a y direction, and, when each of inspecting surfaces of the N area sensors is a rectangle of Lsx (length)×Lsy (length), the N area sensors are arranged at an interval of Lsx in the x direction and a direction in which the stage is continuously moved is the x direction, the image sensing apparatus repeatedly performs operations for sequentially fetching the image for each pulse of the pulse laser light by use of a corresponding one of the area sensors in order starting from a first one of the areas sensors which lies on an end position in a −x direction and starting to fetch the image from the first one of the area sensors which lies on the end position in the −x direction after the image is fetched from an Nth one of the area sensors which lies on an end position in the x direction.

7. The pattern inspection apparatus according to claim 5, wherein, when an area on the to-be-inspected object which is conjugate with each of inspecting surfaces of the plurality of area sensors is a rectangle of Lx (length)×Ly (length) and n is a positive integer, the stage driving apparatus closely scans the to-be-inspected object by repeatedly performing operations for continuously moving the to-be-inspected object at a speed of LxF/n in an x direction and then making stepwise movement of Ly in a y direction, and, when each of the inspecting surfaces of the N area sensors is a rectangle of Lsx (length)×Lsy (length), the N area sensors are arranged at an interval of Lsx/n in the x direction and the direction in which the stage is continuously moved is the x direction, the image sensing apparatus repeatedly performs operations for sequentially fetching the image for each pulse of the pulse laser light by use of each of the area sensors in order starting from a first one of the area sensors which lies on an end position in a −x direction and starting to fetch the image from the first one of the area sensors which lies on the end position in the −x direction after the image is fetched from an Nth one of the area sensors which lies on an end position in the x direction, and the comparator calculates average data by averaging n image information items obtained for respective coordinates on the to-be-inspected object corresponding to one pixel on each of the area sensors based on position data of the stage and image data obtained from the image sensing apparatus and compares the average data with the previously prepared reference data.

8. The pattern inspection apparatus according to claim 5, wherein, when an area on the to-be-inspected object which is conjugate with each of inspecting surfaces of the N area sensors is a rectangle of Lx (length)×Ly (length) and n is a positive integer, the stage driving apparatus closely scans the to-be-inspected object by repeatedly performing operations for continuously moving the to-be-inspected object at a speed of LxF/n in an x direction and then making stepwise movement of Ly in a y direction, and, when each of the inspecting surfaces of said N area sensors is a rectangle of Lsx (length)×Lsy (length), n is a multiple of N, the N area sensors are arranged at an interval of at least Lsx in the x direction and the direction in which the stage is continuously moved is the x direction, the image sensing apparatus repeatedly performs operations for sequentially fetching the image for each pulse of the pulse laser light by use of each of the area sensors in order starting from a first one of the area sensors which lies on an end position in a −x direction and then starting again to fetch the image from the first one of the area sensors which lies on the end position in the −x direction after the image is fetched from an Nth one of the area sensors which lies on an end position in the x direction, and the comparator calculates averaged data by averaging n image information items obtained for respective coordinates on the to-be-inspected object corresponding to one pixel on each of the area sensors based on position data of the stage and image data obtained from the image sensing apparatus and compares the averaged data with the previously prepared reference data.

9. A pattern inspection method, comprising:

sequentially illuminating a partial area on a to-be-inspected object with pulse laser light from a pulse laser light source at a frequency F;

focusing light from the to-be-inspected object illuminated by the pulse laser light on at least one area sensor to sense image data of the partial area once for each pulse of the pulse laser light;

continuously moving a stage having the to-be-inspected object placed thereon at a speed of LxF/n (n is a positive integer) in an X direction when the partial area on the to-be-inspected object fetched by one measurement by the at least one area sensor is a rectangle of Lx (which is a length in the X direction)×Ly (which is a length in a Y direction);

moving the stage by at least Ly in a stepwise fashion in the Y direction;

repeatedly making movements of the to-be-inspected object in the X direction and the Y direction to two-dimensionally scan the to-be-inspected object;

calculating average data by averaging n image information items obtained for respective coordinates on the to-be-inspected object corresponding to one pixel on the at least one area sensor based on position data of the stage and image data obtained from an image sensing apparatus; and comparing the image data obtained by the at least one area sensor with previously prepared reference data to detect defects of a pattern.

10. The pattern inspection method according to claim 9, further comprising detecting a position of the stage in synchronism with the pulse laser light.

* * * * *